(12) United States Patent
Falk

(10) Patent No.: US 11,288,400 B2
(45) Date of Patent: Mar. 29, 2022

(54) METHOD, TRANSMITTER, AND RECEIVER FOR AUTHENTICATING AND PROTECTING THE INTEGRITY OF MESSAGE CONTENTS

(71) Applicant: Siemens Aktiengesellshaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 8 days.

(21) Appl. No.: 16/339,484

(22) PCT Filed: Oct. 10, 2017

(86) PCT No.: PCT/EP2017/075733
§ 371 (c)(1),
(2) Date: Apr. 4, 2019

(87) PCT Pub. No.: WO2018/069271
PCT Pub. Date: Apr. 19, 2018

(65) Prior Publication Data
US 2020/0259661 A1 Aug. 13, 2020

(30) Foreign Application Priority Data
Oct. 13, 2016 (DE) .................. 10 2016 219 926.9

(51) Int. Cl.
*G06F 21/64* (2013.01)
*H04L 9/32* (2006.01)
(Continued)

(52) U.S. Cl.
CPC ............ *G06F 21/64* (2013.01); *H04L 9/3242* (2013.01); *H04W 12/06* (2013.01); *H04W 12/065* (2021.01); *H04W 12/106* (2021.01)

(58) Field of Classification Search
USPC ........ 713/168, 150, 163, 181; 726/2, 21, 36; 380/255, 264, 276
See application file for complete search history.

(56) References Cited

U.S. PATENT DOCUMENTS 5,103,445 A * 4/1992 Ostlund ............... H04W 28/02
370/329
5,345,507 A * 9/1994 Herzberg .............. H04L 9/32
380/28
(Continued)

FOREIGN PATENT DOCUMENTS

CN 101202623 A 6/2008
CN 101753308 A 6/2010
(Continued)

OTHER PUBLICATIONS

PCT International Search Report of International Searching Authority dated Dec. 12, 2017 corresponding to PCT International Application No. PCT/EP2017/075733 filed Oct. 10, 2017.

*Primary Examiner* — Sharif E Ullah
(74) *Attorney, Agent, or Firm* — Schmeiser, Olsen & Watts LLP

(57) ABSTRACT

A method for providing messages which can be authenticated is provided. The method has a step of determining a repeating message content of the messages, a step of calculating sub-authentication codes for the messages using the repeating message content, wherein a first authentication code can be calculated for at least some of the messages from at least one part of the sub-authentication code in order to authenticate the repeating message content, and a step of providing the messages, wherein the messages contain the repeating message content and at least one respective sub-authentication code of the sub-authentication codes.

9 Claims, 6 Drawing Sheets

(51) Int. Cl.
*H04W 12/06* (2021.01)
*H04W 12/065* (2021.01)
*H04W 12/106* (2021.01)

(56) References Cited

U.S. PATENT DOCUMENTS

| | | | |
|---|---|---|---|
| 5,604,801 | A | 2/1997 | Dolan et al. |
| 8,300,811 | B2 | 10/2012 | Georgiades et al. |
| 8,531,247 | B2 | 9/2013 | Dichtl |
| 8,660,265 | B2 * | 2/2014 | Mazuz ................ H04L 9/0625 380/37 |
| 8,843,761 | B2 | 9/2014 | Meyer et al. |
| 8,892,616 | B2 | 11/2014 | Dichtl |
| 9,147,088 | B2 | 9/2015 | Falk et al. |
| 9,361,151 | B2 * | 6/2016 | Gamer ................ G06F 9/461 |
| 2001/0021254 | A1 * | 9/2001 | Furuya ................ H04L 9/0625 380/259 |
| 2005/0070320 | A1 * | 3/2005 | Dent ................ H04W 72/005 455/516 |
| 2007/0130084 | A1 * | 6/2007 | Kay ................ G06Q 20/3674 705/67 |
| 2008/0021834 | A1 * | 1/2008 | Holla ................ G16H 40/67 705/51 |
| 2011/0196965 | A1 * | 8/2011 | Romero ................ H04L 9/12 709/225 |
| 2011/0203005 | A1 * | 8/2011 | Hamada ................ G06F 21/608 726/28 |
| 2013/0156180 | A1 * | 6/2013 | Hess ................ H04L 9/003 380/28 |
| 2014/0237237 | A1 * | 8/2014 | Brumley ................ H04L 63/123 713/168 |
| 2015/0264080 | A1 * | 9/2015 | Bu er ................ H04L 63/1458 726/23 |
| 2015/0341343 | A1 * | 11/2015 | Dichtl ................ G06K 19/07318 380/270 |
| 2017/0195878 | A1 * | 7/2017 | Takemori ................ B60R 16/023 |
| 2020/0259661 | A1 * | 8/2020 | Falk ................ H04L 9/065 |

FOREIGN PATENT DOCUMENTS

| | | |
|---|---|---|
| CN | 102082668 A | 6/2011 |
| CN | 103312668 A | 9/2013 |
| DE | 69629857 T2 | 7/2004 |
| DE | 102005025325 A1 | 12/2006 |
| EP | 1615370 A1 | 1/2006 |
| EP | 2605445 A1 | 6/2013 |
| EP | 2870565 A1 | 5/2015 |
| EP | 2891102 A1 | 7/2015 |
| EP | 2605445 B1 | 9/2015 |
| JP | 2011170544 A | 9/2011 |
| JP | 2016012917 A | 1/2016 |
| RU | 2425450 C2 | 7/2011 |
| WO | 9421066 | 9/1994 |
| WO | WO 9421066 A1 | 9/1994 |
| WO | WO 2008010287 A1 | 1/2008 |
| WO | WO 2012153530 A1 | 11/2012 |

* cited by examiner

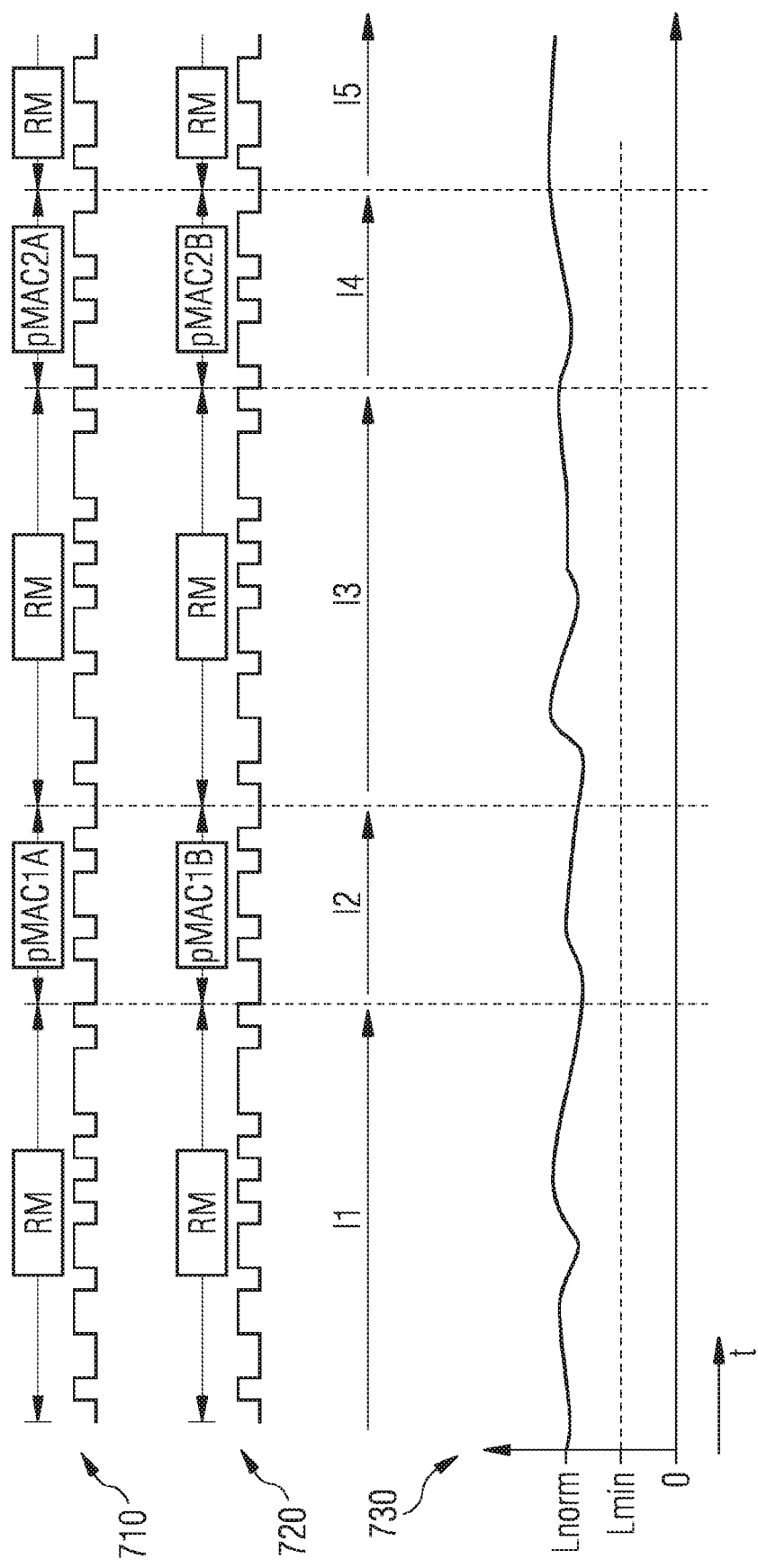

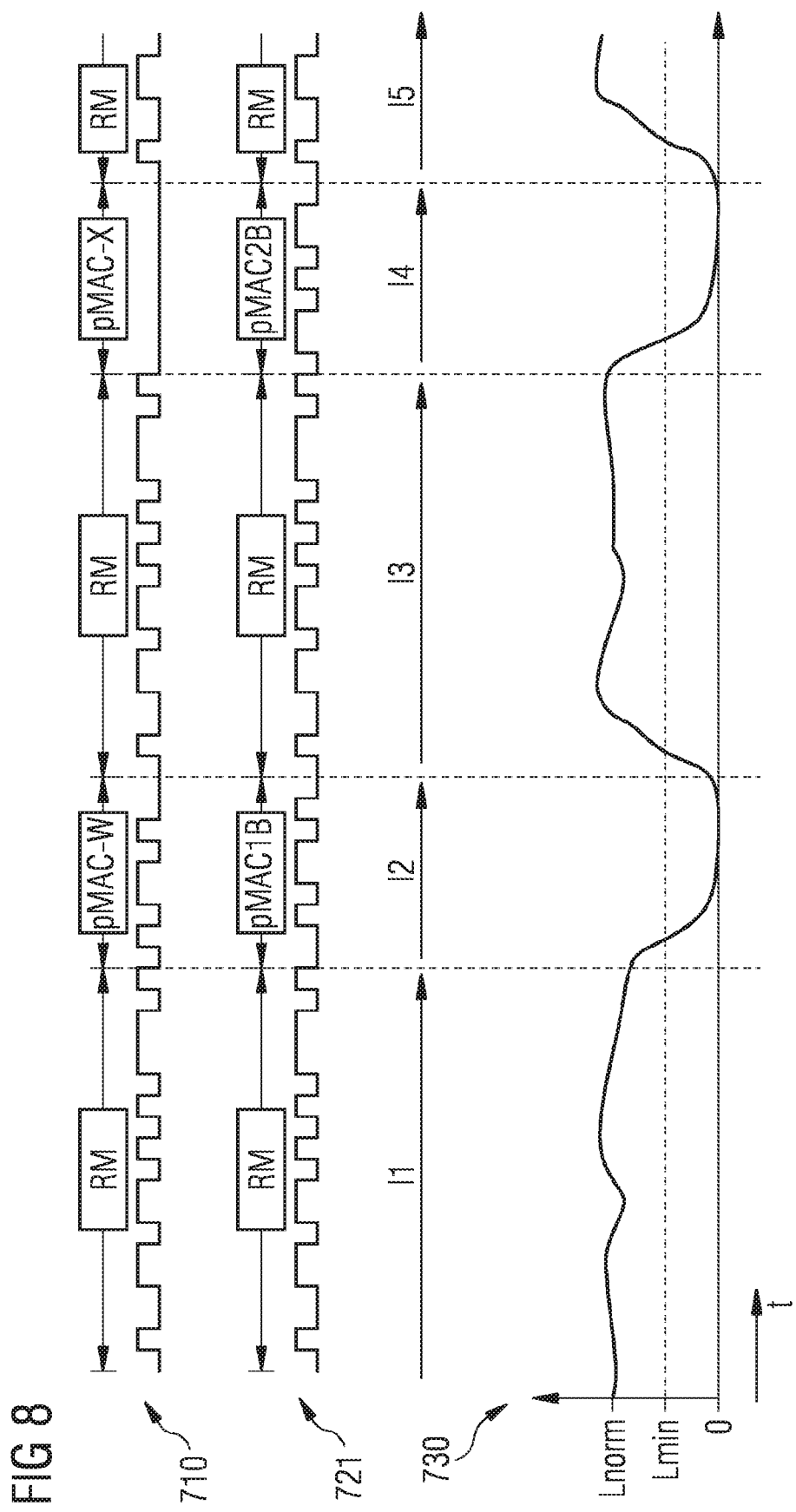

METHOD, TRANSMITTER, AND RECEIVER FOR AUTHENTICATING AND PROTECTING THE INTEGRITY OF MESSAGE CONTENTS

CROSS-REFERENCE TO RELATED APPLICATIONS

This application claims priority to PCT Application No. PCT/EP2017/075733, having a filing date of Oct. 10, 2017, which is based on German Application No. 10 2016 219 926.9, having a filing date of Oct. 13, 2016, the entire contents both of which are hereby incorporated by reference.

FIELD OF TECHNOLOGY

The following relates to a method, a transmitter, and a receiver for authenticating and protecting the integrity of message contents.

BACKGROUND

A beacon provides a repeating message content by means of messages via a radio interface such as Bluetooth Low Energy (for example a beacon message). This is used, for example, for indoor localization or for advertisements. The beacon content, for example the repeating message content, can be fixed (for example beacon ID, position, URL with reference to further information) or, in principle, may also have variable components (for example time, status signal of a light signal system, temperature values).

The document U.S. Pat. No. 8,531,247 B2, the document U.S. Pat. No. 8,892,616 B2, the document U.S. Pat. No. 8,300,811 B2, the document U.S. Pat. No. 9,147,088 B2, the document EP 2 605 445 B1, the document EP 2 870 565 A1, the document EP 2 891 102 A1 and the document U.S. Pat. No. 8,843,761 B2 are known from the prior art.

SUMMARY

An aspect relates to a method and devices which ensure an integrity and/or an authenticity of the repeating message content.

According to a first aspect, embodiments of the invention relates to a method for providing messages which can be authenticated, having the method steps of:
  determining a repeating message content of the messages;
  calculating partial authentication codes for the messages on the basis of the repeating message content, wherein a first authentication code for at least some of the messages can be calculated from at least some of the partial authentication codes for authenticating the repeating message content; and
  providing the messages, wherein the messages comprise the repeating message content and at least one of the partial authentication codes in each case.

Unless stated otherwise in the following description, the terms "carry out", "calculate", "computer-aided", "compute", "determine", "generate", "configure", "reconstruct" and the like preferably relate to actions and/or processes and/or processing steps which change and/or generate data and/or convert the data into other data, wherein the data can be represented or can be present, in particular, as physical variables, for example as electrical pulses. In particular, the expression "computer" should be interpreted as broadly as possible to cover all electronic devices with data processing properties, in particular. Computers may therefore be, for example, personal computers, servers, handheld computer systems, pocket PC devices, mobile radio devices and other communication devices which can process data in a computer-aided manner, processors and other electronic data processing devices.

In connection with embodiments of the invention, "computer-aided" can be understood as meaning, for example, an implementation of the method in which a processor, in particular, carries out at least one method step of the method.

In connection with embodiments of the invention, a processor can be understood as meaning, for example, a machine or an electronic circuit. A processor may be, in particular, a main processor (Central Processing Unit, CPU), a microprocessor or a microcontroller, for example an application-specific integrated circuit or a digital signal processor, possibly in combination with a storage unit for storing program instructions, etc. A processor may also be, for example, an IC (Integrated Circuit), in particular an FPGA (Field Programmable Gate Array) or an ASIC (Application-Specific Integrated Circuit) or a DSP (Digital Signal Processor). A processor can also be understood as meaning a virtualized processor or a soft CPU. It may also be, for example, a programmable processor which is equipped with configuration steps for carrying out said method according to embodiments of the invention or is configured using configuration steps in such a manner that the programmable processor implements or achieves the features according to embodiments of the invention of the method, of the component, of the modules or of other aspects and partial aspects of embodiments of the invention.

In connection with embodiments of the invention, a "storage unit" can be understood as meaning, for example, a memory in the form of a main memory (Random-Access Memory, RAM) or a hard disk.

In connection with embodiments of the invention, a "module" can be understood as meaning, for example, a processor and/or a storage unit for storing program instructions. For example, the processor is specifically set up to execute the program instructions in such a manner that the processor performs functions for implementing the method according to the invention or a step of the method according to the invention.

In connection with embodiments of the invention, an "authentication code" can be understood as meaning, for example, a message authentication code (MAC), checksums, cryptographic checksums or a stream cipher which is formed, for example, using a message content, in particular the repeating message content. For example, the authentication code may be a MAC or an HMAC (Keyed-Hash Message Authentication Code) which is calculated, in particular, using a function, a cryptographic function, for example a one-way function, a hash function or a cryptographic hash function. The authentication code may also be a digital signature, for example.

In connection with embodiments of the invention, a "first authentication code" can be understood as meaning, for example, a first buffer or an assembled authentication code which comprises, in particular, one or more partial authentication codes. In other words, the first authentication code may be formed, for example, from a single partial authentication code or may be composed of a plurality of partial authentication codes.

In connection with embodiments of the invention, a "third authentication code" can be understood as meaning, for example, a third buffer or an assembled authentication code which comprises, in particular, one or more local partial authentication codes. In other words, the third authentication code may be formed, for example, from a single local partial authentication code or may be composed of a plurality of local partial authentication codes.

In connection with embodiments of the invention, a "partial authentication code" can be understood as meaning, for example, a part or a section of an authentication code. For example, an authentication code can be broken down into a number of parts or sections. In particular, an authentication code having a length of 256 bits can be broken down into 16 parts or sections each having a length of 16 bits. Partial authentication codes may also be formed, for example, by short authentication codes, for example having a length of 16 bits each, which are each formed, in particular, using different sections of the repeating message content. A long authentication code, for example having a length of 256 bits, can then be formed, in particular, by combining the partial authentication codes to form the long authentication code. For example, a long authentication code, for example having a length of 256 bits, can be calculated by then combining 16 partial authentication codes, for example, to form an authentication code having a length of 256 bits. The respective messages each comprise partial authentication codes which differ from one another (that is to say, in particular, partial authentication codes which relate to different sections of the repeating message content). In particular, messages may also comprise a plurality of partial authentication codes. In particular, the respective messages may each comprise identical partial authentication codes, for example to transmit partial authentication codes in a redundant manner. In particular, partial authentication codes which are formed, for example, by a receiver or an authenticator of the repeating message content are referred to as local partial authentication codes, for example. The partial authentication codes may be partial checksums, for example, or may be implemented as the latter.

In connection with embodiments of the invention, a "correlator" can be understood as meaning, for example, a device which accurately determines the time delay between two signals by means of cross-correlation. Possible embodiments are, for example, special computers, analog circuits or computer programs. The signals may be technically coded radio signals, for example. They may also be radar, sonar or optical signals, for example.

In connection with embodiments of the invention, a "repeating message content" can be understood as meaning, for example, an identical message content, for example a cyclically repeating spreading code sequence, which is repeatedly transmitted. However, a repeating message content may also be, for example, a change to the message content that can be understood by a receiver. This may be, for example, a counter which is incremented, in particular for transmitted messages, a date, a time or a value which can be calculated in another manner. It is also possible, for example, for the message content, in particular, to be subjected to a slow change frequency. In this case, a particular number of bits of the message content change, for example, within a particular time window, only a small number of bits, wherein the changed bits can be identified by a receiver. In other words, a "repeating message content" can also be understood as meaning, for example, a substantially identical message content. In addition, the repeating message content can be cyclically transmitted, for example, in particular according to a predefined timing scheme. In particular, however, the transmission of the repeating message content can also be controlled, for example, by means of requests or triggers.

In connection with embodiments of the invention, "provision" can be understood as meaning, for example, storage of a message in a memory or storage module. However, "provision" can also be understood as meaning transmission of a message, for example to a receiver or an authentication device. In particular, when providing the messages having the repeating message content, the respective partial authentication code of the respective message or of the repeating message content can be provided, for example, by appending the respective partial authentication code to the respective message or to the repeating message content. Alternatively, the respective partial authentication code, in particular, can replace a part of the respective message or of the repeating message content or can be linked to the respective message or to the repeating message content by means of the exclusive OR operation. It is also possible, for example, for the partial authentication codes to be transmitted separately as a separate message but to be logically assigned to a respective message.

In connection with embodiments of the invention, a "sufficient correspondence" can be understood as meaning, for example, a substantial correspondence between two authentication codes. This is present, for example, if the two authentication codes correspond. A sufficient correspondence can also be present, for example, when slight differences between the two authentication codes have been determined. This may be the case, for example, when a particular number of partial authentication codes, from which one of the authentication codes is calculated in particular, are missing, are incorrect or have deviations from a correct value, for example. A sufficient correspondence can be determined, for example, when a particular threshold value is complied with.

In connection with embodiments of the invention, a "minimum length", "length" and the like, in particular with respect to data, for example messages, partial authentication codes, authentication codes, repeating messages, can be understood as meaning, for example, the length in bits, in particular of data, for example of authentication codes or of a message.

In connection with embodiments of the invention, "messages", "message content" and the like can be understood as meaning, for example, signals which code messages, for example. "Messages", "message content" and the like may also be understood as meaning, for example, spreading code sequences, data, user data or data structures in which information is stored or with which information is transmitted, in particular. The message content or the content of the messages is repeated, in particular, in a plurality of messages, for example in at least two messages, in at least 10 messages, in particular more in at least 20 messages.

"Authentication of messages" and the like, in particular in connection with the repeating message content, can be understood as meaning, for example, a determination of the authenticity and/or the integrity of the repeating message content if there is a sufficient correspondence between the third authentication code and the first authentication code. A valid authentication code/partial authentication code or a validity of an authentication code/partial authentication code, in particular, can also be understood as meaning, for example, the determination of an integrity and/or an authenticity of the repeating message content or the determination of an integrity and/or an authenticity of sections of the repeating message content.

In connection with embodiments of the invention, a "provision device" can be understood as meaning, for example, a transmitter or a transmission device, wherein the provision device may be, for example, a Bluetooth Low Energy device, an RFID transmitter, a communication module of a satellite system, a transmission module of a satellite navigation system or a mobile radio base station. In particular, a provision device is an apparatus or a device which has, in particular, only few resources for transmitting messages.

In connection with embodiments of the invention, an "authentication device" can be understood as meaning, for example, a receiver, wherein the authentication device may be, in particular, a Bluetooth Low Energy receiver, an RFID receiver or a reception module for signals from a satellite navigation system. In particular, an authentication device is an apparatus or a device which has more resources than the transmitter.

In connection with embodiments of the invention, "resources" can be understood as meaning, for example, an available bandwidth for transmitting messages, available energy for operating a transmitter or a provision device or available computing capacities of a transmitter or of a provision device.

In connection with embodiments of the invention, "computing capacities" can be understood as meaning, for example, the clock rate or storage capacities, for example of a processor.

In connection with embodiments of the invention, "cryptographic protection" can be understood as meaning, for example, protection of messages or of a repeating message content of the messages by virtue of the fact that an integrity and an authenticity of the repeating message content can be checked, for example. Furthermore, "cryptographic protection" can be understood as meaning, for example, the fact that replication of a valid repeating message content at another location by another transmitter is prevented, for example.

It is also noted that the expression "method steps" and the like, in particular, does not imply any chronological sequence of the method steps of the methods according to embodiments of the invention.

The method is advantageous, for example, if a transmitter having, in particular, few resources for generating and transmitting messages, would like to cryptographically protect messages or repeating message contents of the messages, for example. The embodiments increase, in particular, the security level of repeatedly emitted messages having a repeating message content. For example, a receiver can immediately check the messages, in which case a relatively weak security level is achieved in this case. The method is advantageous, in particular, since the more messages having the repeating message content (and different partial authentication codes) are received, the higher the security level achieved becomes, in particular. In other words, the security level gradually increases, for example, with the number of received messages, wherein the messages each comprise at least one partial authentication code.

Partial authentication codes whose size would be insufficient, for example from a cryptographic point of view, can be used in the individual messages, for example. In particular, however, a higher security level is achieved by virtue of the fact that a plurality of messages and their partial authentication codes can be evaluated by the receiver, for example. A predefined security level can be achieved, for example, by checking a plurality of partial authentication codes, in particular different partial authentication codes, of the messages. If, for example, a length of 128 bits is required for an authentication code, for example for the first authentication code, this can be composed, for example, of different partial authentication codes each having a length of 8 bits, for example. During their calculation, the partial authentication codes are each formed using different sections of the repeating message content, for example. A receiver then calculates the authentication code, for example the first authentication code, on the basis of respectively different partial authentication codes or forms local partial authentication codes for the respective sections of the repeating message content which are each protected, in particular, with the partial authentication codes provided by a transmitter.

For example, to calculate the partial authentication codes, the repeating message content is subdivided into sections having a predefined length, for example 4 bits, and short authentication codes, for example having a length of 8 bits, are each calculated using the respective sections which can then be used as the partial authentication codes, for example.

The messages then each comprise different partial authentication codes, wherein a plurality of messages may each comprise an identical partial authentication code, for example. As a result, if messages are lost for example, the first authentication code, in particular, can be calculated as completely as possible despite this loss. A message may comprise, in particular, one partial authentication code or else a plurality of identical or different partial authentication codes. In addition, a message may contain, for example, yet further data, for example rapidly changing user data.

In addition, the messages may contain, for example, data fields which indicate that section of the repeating message content of the respective message to which the respective partial authentication code of the respective message relates. It is also possible to provide, for example, data fields which indicate the size of the respective partial authentication code, for example 8 bits or 4 bits. Alternatively, an assignment of the respective partial authentication codes to the respective sections of the repeating message content can be determined, for example, by the provision sequence or reception sequence.

In a first embodiment of the method, the partial authentication codes are calculated on the basis of a second authentication code, and the second authentication code is calculated on the basis of the repeating message content.

The method is advantageous, for example, for easily forming partial authentication codes which correspond to predefined security guidelines. This may be, for example, a predefined length of the first or second authentication code, or a particular method or a particular algorithm for creating the partial authentication codes and/or the first authentication code and/or the second authentication code can be predefined or required, for example. In this case, the partial authentication codes and/or the first authentication code and/or the second authentication code are generated by a cryptographic function, for example a hash function or a one-way function. For example, to calculate the partial authentication codes and/or the second authentication code, the repeating message content is subdivided into sections having a predefined length, for example sections of 4 bits, and short authentication codes, for example having a length of 8 bits, are each calculated using the respective sections which can then be used as the partial authentication codes, for example. However, it is also conceivable, for example, for the second authentication code to be formed using the repeating message content and to then be broken down into sections which are then used as partial authentication codes.

In further embodiments of the method, a first length of the respective partial authentication codes is stipulated for the respective messages.

The method is advantageous, for example, if the resources available for creating the message, the partial authentication codes or for transmitting/providing the messages in a transmitter change, for example. Many resources are available, for example, to a transmitter operated using a battery and solar cells, for example, if the solar cells are currently exposed to the sunlight. In this situation, it is possible, for example, to supply a transmitter with more energy, with the result that the latter can also transmit longer messages or long partial authentication codes. The transmitter can then communicate a change in the length of the partial authentication codes to a receiver, for example, using a predefined data field in the message, for example.

In further embodiments of the method, a predefined minimum length of the first authentication code is determined by a first number of the messages.

The method is advantageous, for example, for achieving a required minimum length of the first authentication code, for example. This minimum length can state, for example, that the first authentication code should have at least this length to be accepted by a transmitter. If, for example, the required minimum length of the first authentication code is 128 bits, for example to achieve a predefined security level, 8 different partial authentication codes each with a length of 16 bits are needed, for example, to calculate the first authentication code from these partial authentication codes.

In further embodiments of the method, an authenticity and/or an integrity of the repeating message content of the messages is/are determined on the basis of a second number of the messages and their respective partial authentication codes.

The method is advantageous, for example, for creating the partial authentication codes in a manner which is as flexible as possible and for calculating the first authentication code from said partial authentication codes in a manner which is as flexible as possible, for example. In this respect, the first authentication code is calculated, in particular, on the basis of the partial authentication codes and the second number of the messages to determine, for example, the authenticity and/or the integrity of the repeating message content. As a result, different situations, for example transmission of the messages via a trusted network or an untrusted network, for which respectively different security guidelines or security levels are required can be implemented by means of the method, for example. This is carried out, for example, by achieving, in particular, different security requirements/security levels of the respective security guideline, for example by means of the number and/or length of the partial authentication codes or authentication codes, in which case the security level is increased, in particular, by the number of received messages. The authenticity and/or the integrity of the repeating message content can therefore be determined, in particular, on the basis of the second number of partial authentication codes which have been received by a receiver, for example. In particular, it is also possible for the first number to correspond to the second number or vice versa, for example.

In particular, the second number of messages are messages having respectively different partial authentication codes.

However, it is also possible, for example, for the authenticity and/or the integrity of the repeating message content to be determined, in particular, on the basis of a third number of partial authentication codes, wherein the third number is transmitted within a predefined interval of time.

In particular, the third number of messages are messages having respectively different partial authentication codes.

The authenticity and/or the integrity is/are determined, for example, by a receiver by forming this in particular one third authentication code using the repeating message content. In particular, this third authentication code is compared with the first authentication code and the authenticity and/or the integrity of the repeating message content is/are determined if there is a sufficient correspondence between these two authentication codes.

In further embodiments of the method, the first authentication code and/or the second authentication code is/are a message authentication code and/or a stream cipher.

The method is advantageous, for example, for creating the authentication codes in a manner which is as simple as possible. In particular, the message authentication code, for example, may be composed of a plurality of further message authentication codes, in which case the further message authentication codes are the partial authentication codes.

In further embodiments of the method, the partial authentication codes are sections of the second authentication code, and/or the partial authentication codes are sections of the stream cipher or of a stream cipher.

The method is advantageous, for example, for calculating partial authentication codes for respectively different sections of the repeating message content in a manner which is as simple as possible.

According to a second aspect, embodiments of the invention relates to a method for authenticating messages which can be authenticated, having the method steps of:
  determining a repeating message content of the messages;
  determining partial authentication codes of the messages for the repeating message content;
  calculating local partial authentication codes for the messages on the basis of the repeating message content;
  comparing the partial authentication codes with the corresponding local partial authentication codes;
  determining an authenticity and/or an integrity of the repeating message content if there is a sufficient correspondence between the partial authentication codes and the corresponding local partial authentication codes.

The method is advantageous, for example, for checking messages, in particular, or repeating message contents of the messages from a transmitter, which has few resources for generating and transmitting the messages in particular, for their authenticity and integrity by means of a receiver. The embodiments increase, in particular, the security level of repeatedly emitted messages having a repeating message content. For example, a receiver can immediately check the messages, in which case a relatively weak security level is achieved in this case. The method is advantageous, in particular, since the more messages having the repeating message content (and different partial authentication codes) are received, the higher the achieved security level. In other words, the security level gradually increases with the number of received messages, for example, in which case the messages each comprise, in particular, at least one partial authentication code.

Partial authentication codes whose size would be insufficient from a cryptographic point of view, for example, can be used in the individual messages, for example. In particular, however, a higher security level is achieved by virtue of the fact that a plurality of messages and, in particular, their partial authentication codes can be evaluated by the receiver, for example. A predefined security level can be achieved, for example, by checking a plurality of partial authentication codes of the messages. If, for example, a length of 128 bits is required for an authentication code, for example for the first authentication code, the latter can be composed, for example, of different partial authentication codes each having a length of 8 bits, for example. During their calculation, the partial authentication codes are each formed, for example, using different sections of the repeating message content. A receiver then calculates the authentication code for the repeating message content, for example the first authentication code, on the basis of respectively different partial authentication codes and/or forms local partial authentication codes for the respective sections of the repeating message content which are each protected, in particular, with the partial authentication codes provided by the transmitter.

The local partial authentication codes are calculated, in particular, in a similar manner to the partial authentication code provided in the messages by the transmitter. For example, to calculate the local partial authentication codes, the repeating message content is subdivided into sections having a predefined length, for example 4 bits, and short authentication codes, for example having a length of 8 bits, are each calculated using the respective sections which can then be used as the local partial authentication codes, for example.

The messages provided by the transmitter then each comprise different partial authentication codes, wherein a plurality of messages may each comprise an identical partial authentication code, for example. As a result, if messages are lost for example, in particular the first authentication code, can be calculated as completely as possible despite this loss. A message may comprise, in particular, one partial authentication code or else a plurality of identical or different partial authentication codes. In addition, a message may contain, for example, yet further data, for example rapidly changing user data.

The method according to embodiments of the invention can be used, for example, to implement different situations, in particular transmission of the messages via a trusted network or an untrusted network, for which respectively different security guidelines are required. This is carried out, for example, by achieving, for example, different security requirements of the respective security guideline, for example by means of the number and/or length of the partial authentication codes authentication codes, in which case the security level is increased, in particular, by the number of received messages. The authenticity and/or the integrity of the repeating message content can therefore be determined, in particular, on the basis of the second number of partial authentication codes which have been received by a receiver, for example.

In particular, the second number of messages are messages having respectively different partial authentication codes.

However, it is also possible, for example, for the authenticity and/or the integrity of the repeating message content to be determined, in particular on the basis of a third number of partial authentication codes, wherein the third number is transmitted within a predefined interval of time.

In particular, the third number of messages are messages having respectively different partial authentication codes.

The authenticity and/or the integrity is/are determined, for example, by a receiver by forming, in particular, a third authentication code using the repeating message content. In particular, this third authentication code is compared with the first authentication code and the authenticity and/or the integrity of the repeating message content is/are determined if there is a sufficient correspondence between these two authentication codes. The third authentication code may be formed, for example, from the local partial authentication codes, in particular by a receiver.

In addition, the messages may contain, for example, data fields which indicate that section of the repeating message content of the respective message to which the respective partial authentication code of the respective message relates. It is also possible to provide, for example, data fields which indicate the size of the respective partial authentication code, for example 8 bits or 4 bits. Alternatively, an assignment of the respective partial authentication codes to the respective sections of the repeating message content can be determined, for example, by the provision sequence or reception sequence.

In further embodiments of the method,
 a first authentication code is calculated from at least some of the partial authentication codes for the repeating message content;
 a third authentication code is calculated for the repeating message content or from at least some of the local partial authentication codes for the repeating message content;
 during the comparison, the first authentication code is compared with the third authentication code, and an authenticity and/or an integrity of the repeating message content is/are determined if there is a sufficient correspondence between the third authentication code and the first authentication code.

In further embodiments of the method, the partial authentication codes are calculated on the basis of a second authentication code, and the second authentication code is calculated on the basis of the repeating message content.

In further embodiments of the method, a first length of the respective partial authentication codes is stipulated for the respective messages.

In further embodiments of the method, a predefined minimum length of the first authentication code is determined by a first number of the messages.

In further embodiments of the method, the first authentication code and/or the second authentication code and/or the third authentication code is/are a message authentication code and/or a stream cipher.

The method is advantageous, for example, for creating the authentication codes in a manner which is as simple as possible. In particular, the message authentication code, for example, may be composed of a plurality of further message authentication codes, in which case the further message authentication codes, in particular, are the partial authentication codes.

According to a third aspect, embodiments of the invention relates to a provision device for providing messages which can be authenticated, having:
 a first calculation module for determining a repeating message content of the messages;
 a second calculation module for calculating partial authentication codes for the messages on the basis of the repeating message content, wherein a first authentication code for at least some of the messages can be calculated from at least some of the partial authentication codes for authenticating the repeating message content; and
 a first provision module for providing the messages, wherein the messages comprise the repeating message content and at least one of the partial authentication codes in each case.

In another embodiment of the provision device, the provision device comprises at least one further module or a plurality of further modules for carrying out the method according to embodiments of the invention which provides messages which can be authenticated.

According to a fourth aspect, embodiments of the invention relates to an authentication device for authenticating messages which can be authenticated, having:
- a third calculation module for determining a repeating message content of the messages;
- a fourth calculation module for determining partial authentication codes of the messages for the repeating message content;
- a fifth calculation module for calculating local partial authentication codes for the messages on the basis of the repeating message content;
- a first comparison module for comparing the partial authentication codes with the corresponding local partial authentication codes;
- a first determination module for determining an authenticity and/or an integrity of the repeating message content if there is a sufficient correspondence between the partial authentication codes and the corresponding local partial authentication codes.

In another embodiment of the authentication device, the authentication device comprises at least one further module or a plurality of further modules for carrying out the method according to the invention which authenticates messages which can be authenticated.

According to a fifth aspect, embodiments of the invention relates to a system for interchanging messages which can be authenticated, having:
- at least one provision device according to embodiments of the invention;
- at least one authentication device according to embodiments of the invention.

In another embodiment of the system, the system comprises at least one further module or a plurality of further modules for carrying out the methods according to embodiments of the invention. The system may comprise, for example, a communication network which is used to communicatively connect the at least one provision device and the at least one authentication device to one another via a communication network.

A computer program product (non-transitory computer readable storage medium having instructions, which when executed by a processor, perform actions) having program instructions for carrying out said methods according to embodiments of the invention is also claimed, wherein one of the methods according to embodiments of the invention, all methods according to embodiments of the invention or a combination of the methods according to embodiments of the invention can be respectively carried out by means of the computer program product.

A variant of the computer program product having program instructions for configuring a creation device, for example a 3-D printer or a production machine suitable for creating processors and/or devices, is additionally claimed, wherein the creation device is configured, using the program instructions, such that said provision device according to embodiments of the invention and/or said authentication device according to embodiments of the invention and/or said system according to embodiments of the invention is/are created.

A provision apparatus for storing and/or providing the computer program product is also claimed. The provision apparatus is, for example, a data storage medium which stores and/or provides the computer program product. Alternatively, and/or additionally, the provision apparatus is, for example, a network service, a computer system, a server system, in particular a distributed computer system, a cloud-based computer system and/or a virtual computer system which stores and/or provides the computer program product, in the form of a data stream.

This provision is carried out, for example, as a download in the form of a program data block and/or an instruction data block, in the form of a file, in particular a download file, or in the form of a data stream, in particular a download data stream, of the complete computer program product. However, this provision can also be carried out as a partial download which consists of a plurality of parts and is downloaded, in particular, via a peer-to-peer network or is provided as a data stream. Such a computer program product is read into a system, for example using the provision apparatus in the form of the data storage medium, and executes the program instructions, with the result that the method according to embodiments of the invention is executed on a computer or the creation device is configured in such a manner that it creates said provision device according to embodiments of the invention and/or said authentication device according to embodiments of the invention and/or said system according to embodiments of the invention.

BRIEF DESCRIPTION

Some of the embodiments will be described in detail, with references to the following Figures, wherein like designations denote like members, wherein:

FIG. 7 shows a scenario in which a valid signal is received according to embodiments of the invention; and FIG. 8 shows a scenario in which an invalid signal is received.

In the figures, functionally identical elements are provided with the same reference signs unless stated otherwise.

Unless stated otherwise or already stated, the following exemplary embodiments have at least one processor and/or a storage device for implementing or carrying out the method.

DETAILED DESCRIPTION

Figure 1:
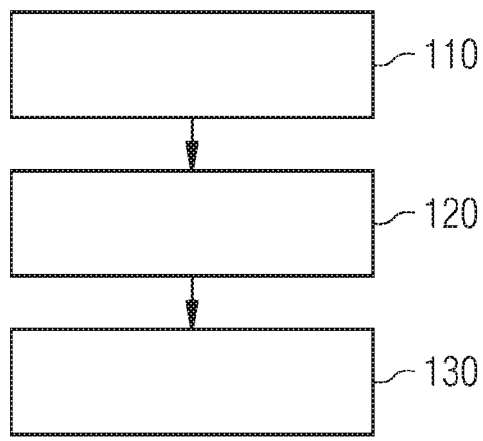
FIG. 1 shows a first exemplary embodiment of the invention in the form of a flowchart of the method according to embodiments of the invention for providing messages which can be authenticated.

FIG. 1 shows a first exemplary embodiment of the invention in the form of a flowchart of the method according to embodiments of the invention for providing messages which can be authenticated. The method is carried out or implemented, in particular, by a transmitter.

The method is computer-aided and is implemented or carried out, in particular, by the transmitter.

The method comprises a first method step 110 for determining a repeating message content of the messages.

A repeating message content may either be a content which is identical over a plurality of messages or may be, for example, a change to the message content which can be understood by a receiver. This may be, for example, a counter which is incremented, in particular for transmitted messages, a date, a time or a value which can be calculated in another manner. It is also possible, for example, for the message content, in particular, to be subjected to a slow change frequency. In this case, a particular number of bits of the message content change, for example, within a particular time window, only a small number of bits, wherein the changed bits can be identified by a receiver.

The method comprises a second method step 120 for calculating partial authentication codes for the messages on the basis of the repeating message content, wherein a first authentication code for at least some of the messages can be calculated from at least some of the partial authentication codes for authenticating the repeating message content.

The partial authentication codes can be formed, for example, using predefined sections of the repeating message content. The respective message which comprises the respective partial authentication code which was formed using the respective predefined section may have an item of information relating to these predefined sections, for example. A predefined section may be, for example, a plurality of bits of the repeating message content. The predefined section may therefore be, in particular, bits 8-16 of the repeating message content.

A cryptographic function, for example, can be used to calculate the partial authentication codes and calculates the partial authentication codes by means of a (cryptographic) key, for example. The cryptographic key forms a secret between a transmitter, which transmits the messages or partial authentication codes, and a receiver, which authenticates the messages or the partial authentication codes and determines their correctness. The cryptographic function is likewise known to the transmitter and to the receiver. The cryptographic function and/or the (cryptographic) key may also be used, for example, to calculate a second authentication code using the repeating message content, which, in some exemplary embodiments, is used as the basis for the partial authentication codes, for example.

The method comprises a third method step 130 for providing the messages, wherein the messages comprise the repeating message content and at least one of the partial authentication codes in each case.

The messages can be provided, for example, by a transmitter, for example a provision device, or a receiver, for example an authentication device, by transmitting the messages to the receiver via a communication network.

For this purpose, the repeating message content can be cyclically transmitted, for example, in particular according to a predefined timing scheme. In particular, however, the transmission of the repeating message content can also be controlled by means of requests or a trigger.

Figure 2:
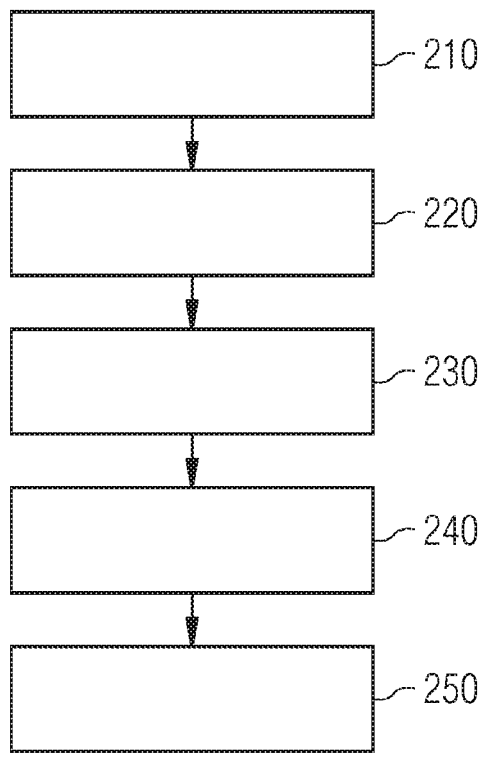
FIG. 2 shows a second exemplary embodiment of the invention in the form of a flowchart of the method according to embodiments of the invention for providing messages which can be authenticated.

FIG. 2 shows a second exemplary embodiment of the invention in the form of a flowchart of the method according to embodiments of the invention for providing messages which can be authenticated. The method is carried out or implemented, in particular, by a receiver.

The method is computer-aided and is implemented, in particular, by the receiver.

The method comprises a first method step 210 for determining a repeating message content of the messages.

The method comprises a second method step 220 for determining partial authentication codes of the messages for the repeating message content.

In this case, the messages may contain, for example, a data field which indicates the location and the length of the respective partial authentication code. However, it is also possible for the format of the messages and/or of the partial authentication codes to be firmly predefined. For example, bits 1-20 are provided for useful data or user data which comprise the repeating message content for example. Bits 21-36 can then be used for partial authentication codes, for example.

The method comprises a third method step 230 for calculating local partial authentication codes for the messages on the basis of the repeating message content. The local partial authentication codes are formed using the same sections of the repeating message content as the partial authentication codes which were formed, for example, when providing the messages or were formed by the transmitter. So that the local partial authentication codes can be formed using the same section of the repeating message content as the corresponding partial authentication codes formed by the transmitter, the messages may each contain, for example, an item of information which indicates that section of the repeating message content to which a partial authentication code relates.

The method comprises a fourth method step 240 for comparing the partial authentication codes with the corresponding local partial authentication codes.

A cryptographic function, for example, can be used to calculate the local partial authentication codes and calculates the partial authentication codes by means of a (cryptographic) key, for example. The cryptographic key forms a secret between a transmitter, which transmits the messages or partial authentication codes, and a receiver, which authenticates the messages or the partial authentication codes and determines their correctness (determining an authenticity and/or an integrity). The cryptographic function is likewise known to the transmitter and to the receiver. The cryptographic function and/or the (cryptographic) key may also be used, for example, to calculate a third authentication code using the repeating message content, which, in some exemplary embodiments, is used as the basis for the partial authentication codes, for example.

The local partial authentication codes are formed, in particular, using the same sections of the repeating message content as the partial authentication codes which were formed, for example, by the transmitter using these sections.

The method comprises a fifth method step 250 for determining an authenticity and/or an integrity of the repeating message content if there is a sufficient correspondence between the partial authentication codes and the corresponding local partial authentication codes.

In other words, partial authentication codes, that is to say local partial authentication codes and partial authentication codes formed by the transmitter, which relate to the same section of the repeating message content are each compared with one another. In this respect, corresponding local partial authentication codes can be understood as meaning, for example, local partial authentication codes which are formed using the same section of the repeating message content as the partial authentication codes which were formed for this section of the repeating message content by the transmitter.

In another variant of the method, a first authentication code is calculated from at least some of the partial authentication codes for the repeating message content. In other words, the first authentication code is calculated, in particular, from the partial authentication codes which were transmitted to a receiver, together with the messages, by a transmitter, for example. The receiver then calculates, for example, a third authentication code for the repeating message content. Alternatively, or additionally, the receiver, in particular, can calculate, for example, the third authentication code from at least some of the local partial authentication codes for the repeating message content. In particular, during the comparison (that is to say during the fourth method step 240 and/or during the fifth method step 250), the first authentication code is compared with the third authentication code, and an authenticity and/or an integrity of the repeating message content, in particular, is determined if there is a sufficient correspondence between the third authentication code and the first authentication code.

Depending on the determined authenticity and/or integrity result, a control signal is provided and indicates, for example to a user, whether the authenticity and/or integrity is/are confirmed. If the determination of the authenticity and/or integrity was not successful, a notification indicating that the authenticity and/or integrity is/are invalid is displayed to the user, for example. Specifically, the authenticity and/or integrity is/are confirmed when the third authentication code has a sufficient correspondence to the first authentication code. The authenticity and/or the integrity is/are invalid, for example, if the third authentication code does not have a sufficient correspondence to the first authentication code. This can also be carried out, for example, only using partial authentication codes by respectively forming, for example, the first authentication code and/or the third authentication code from a partial authentication code which is or was formed using, in particular, a certain section of the repeating message content.

In another variant, the method according to embodiments of the invention is carried out by a backend service of a backend, in which case the messages are each received by receivers and are transmitted to the backend service, for example via a network. The backend service then evaluates the messages which have been received by a particular receiver. Alternatively, the backend service can jointly evaluate the messages received by different receivers and made available to the backend service by the receivers. In this case, evaluation is understood as meaning determination of the authenticity and/or the integrity of the repeating message content if there is a sufficient correspondence between the third authentication code and the first authentication code.

In other words, embodiments of the invention shown, for example, in FIG. 1 and FIG. 2 relates to a method for protecting the integrity and authenticity of messages having repeating message content, for example beacon messages, by means of an authentication code, for example a cryptographic integrity checksum, in particular a Message Authentication Code (MAC), a message integrity code or a digital signature.

In this case, use is advantageously made of the special properties of the repeating message content of the messages, for example of beacon messages, whereby, for example, such a message is regularly repeatedly emitted, for example every 100 ms. In this case, the messages comprise a slowly changing message content or a repeating message content. In other words, parts of the message content of the messages are identical or change at least only partially and slowly. This means, for example, that redundant or identical information is regularly emitted or provided.

The method according to embodiments of the invention protects a sequence or a plurality of messages having repeating message content, for example by means of an authentication code, for example the partial authentication codes, the first authentication code and/or the second authentication code. In this case, individual messages contain a partial authentication code which can also be referred to as a partial MAC or pMAC.

A receiver then receives a plurality of messages from the transmitter, for example. The messages contain a substantially identical message content or a repeating message content and at least one respectively different partial authentication code in each case. The receiver now checks, for example, the plurality of partial authentication codes by virtue of the receiver forming, for example, respective local partial authentication codes for the plurality of partial authentication codes and comparing the respective local partial authentication codes with the respective partial authentication codes (from the transmitter) and, in particular, the correspondence of the repeating message content. The repeating message content is accepted as valid, in particular, when there are a predefined number of corresponding messages and (respectively different) partial authentication codes.

For example, when checking the integrity and/or authenticity, a plurality of different partial authentication codes of the respective messages are checked in combination, in which case the first authentication code or the third authentication code can be calculated during this combination, for example. This combination of the partial authentication codes or of the local partial authentication codes gradually increases the effective key length of the first authentication code or of the third authentication code for each partial authentication code considered. A receiver can achieve a desired security level for the repeating message content, for example, by receiving a plurality of messages having repeating message content and combining the partial authentication codes with one another or, in a similar manner, combining the local partial authentication codes with one another. The receiver can then compare, for example, the respective partial authentication codes or local partial authentication codes with one another to determine, in particular, an authenticity and/or integrity of the repeating message content, in which case this can also be carried out in sections.

For this purpose, the transmitter can use, for example, changing/different partial authentication codes (partial authentication codes which relate to different sections of the repeating message content), for example changing cryptographic partial check codes having 8 bits, 16 bits or 24 bits. An individual partial authentication code of this type would be unsuitable (too weak), for example from a cryptographic point of view, for identifying an attack. In particular, a higher security level can be achieved by jointly checking partial authentication codes of a plurality of messages having repeating message content.

The partial authentication codes can be formed in different ways, for example.

In a first variant, the partial authentication codes can be formed by means of message authentication codes MAC (HMAC, AES-CBCMAC). For this purpose, the full length (for example 128 bits, 256 bits) of a second authentication code, for example a message authentication code, is first calculated using the repeating message content, for example. Individual messages each contain a part of the MAC (for example 8 bits) in the form of a partial authentication code. In this case, an item of information is additionally transmitted in the messages, in particular, said information indicating which part of the second authentication code, in particular in the form of the respective partial identification code, is respectively transmitted. This may be, for example, a number, on the basis of which a receiver can determine, in particular, a sequence of the partial authentication codes to calculate the first authentication code, for example. An asymmetrical digital signature (for example ECDSA, DSA, RSA) can also be transmitted in parts, for example, as a second authentication code or as a partial authentication code.

In another variant, redundant coding is used (for example any desired 8 of 16 messages suffice to be able to reconstruct the second authentication code or the first authentication code). Such redundant transmission is known, for example, from the audio transmission via packet-switched networks, specifically in RTP (RFC2198). In this case too, an item of information is additionally transmitted in the messages, said information indicating, for example, that section of the repeating message content, for example bits 16-32 of the repeating message content, to which the respective partial authentication code relates. A receiver can then determine a longer authentication code, for example the first authentication code, on the basis of this information and the (different) partial authentication codes.

In another variant, the partial authentication codes may be formed from a code sequence or a stream cipher. For this purpose, the messages contain a section of a cryptographic stream cipher as an authentication code which is formed using the repeating message content.

In another variant, the stream cipher is determined on the basis of the message content and/or a counter value and/or an item of time information. In this case, a different part/section of the stream cipher code sequence is used in successive messages.

A message may contain, for example, a transmission identifier (for example fixed, changing, pseudonym) and optionally static or fixed status information (for example temperature, time information, spatial coordinates, URL) which is additionally checked when checking the authenticity and/or integrity. For this purpose, the transmitter, for example, can store this information in the message and a receiver checks whether this status information or messages is/are provided or transmitted within a predefined period, for example.

Various uses of messages having repeating message contents are possible, in particular, for example for indoor localization, in particular in the case of localization in a production hall or a refinery, wireless low-power sensors in a process installation, wireless sensor networks, wireless sensor/actuator networks, intelligent machines/devices which wirelessly provide an item of device identification information or device status information, ticketing, releasing of a machine or door, or tracking of persons or objects.

Different receivers may apply, for example, different criteria with regard to the circumstances under which they accept the repeating message content as valid.

These criteria may depend on the type of message content, for example. The method can also be used, for example, for other repeating message contents, cyclically repeating message contents, for example for navigation messages from a satellite navigation service (GPS, Galileo, Beidou, Glonass). In this case, an individual navigation message (messages having repeating message content) may have, in particular, a partial checksum (partial authentication code) which can be checked for its authenticity and/or integrity, for example at a low security level.

In another variant, the authenticity and/or integrity of the messages is/are determined by the repeating message content being identical. This is determined, in particular, by the first authentication code and the third authentication code, for example, having a sufficient correspondence. The repeating message content may also comprise, for example, user data and/or useful data and/or a transmitter ID.

In another variant, for example, sections or parts of the repeating message content, the authenticity and/or integrity of which has/have been confirmed by the partial authentication codes respectively associated with them, are accepted as valid.

Alternatively, or additionally, sections or parts of the repeating message content can be accepted as valid. This is possible, for example, when the associated partial authentication codes of the respective sections (or parts) have been confirmed as valid by virtue of the first authentication code, for example, having been formed from these partial authentication codes and the validity of the first authentication code having been confirmed. Alternatively, or additionally, the first authentication code can also be checked in sections. If the validity is confirmed for sections of the first authentication code, the sections of the repeating message content are accordingly also accepted as valid.

In other words, the authenticity and/or the integrity of the repeating message contents can also be incompletely accepted as valid by virtue of a valid authenticity and/or integrity respectively being determined, for example, only for those parts or sections of the messages for which valid partial authentication codes or a first authentication code has/have been determined. For example, in messages each having ten sections, in which case one partial authentication code has been respectively formed for each section, the first three sections, the fifth section and the eighth section of the repeating message content of the messages can be thereby classified as valid. The remaining sections are considered to be invalid, for example, until corresponding correct partial authentication codes have been received.

Yet further checking criteria can be additionally taken into account, for example, when determining the authenticity and/or integrity of the messages.

In another variant, the number or rate of different, valid, partial authentication codes during the entire communication between a transmitter and a receiver is taken into account as a checking criterion, with the result that a predefined minimum number must be reached, for example, to accept the repeating message content as valid, in particular. A rate can be understood as meaning, for example, a number of messages which are interchanged, in particular, during the entire communication between a transmitter and a receiver, or there are, for example, predefined time windows within which a predefined minimum number of different partial authentication codes should be interchanged between the transmitter and the receiver.

In another variant, an effective key length of the first authentication code is determined on the basis of the received partial authentication codes by comparing the effective key length with a predefined threshold value, for example. The authenticity and/or the integrity of the repeating message content is/are then accepted as valid if the effective key length exceeds this threshold value.

In another variant, the security level of the repeating message content is dynamically adapted. The security level of the repeating message content is increased, for example, in particular by a predefined value, if a valid partial authentication code is received. The security level falls over the course of time, for example, in particular until a valid partial authentication code is received again which increases the security level of the repeating message content by the predefined value, for example. If the current security level of the repeating message content of a message is higher than a predefined threshold value, for example, the message or the repeating message content is accepted as valid (that is to say the integrity and/or authenticity is/are confirmed).

In another variant, the integrity and/or the authenticity of a message is/are respectively confirmed if the integrity and/or the authenticity of the respective repeating message content of the respective message has/have been confirmed.

In another variant, additional method steps are carried out by providing a (cryptographic) key for calculating the partial authentication codes and/or for calculating the third authentication code and/or for calculating the local partial authentication codes. The provision is effected via a secure communication channel.

Figure 3:
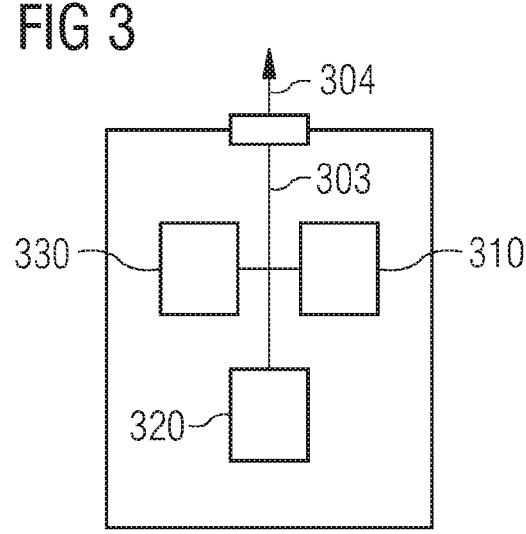
FIG. 3 shows a third exemplary embodiment of the invention in the form of a provision device.

FIG. 3 shows a third exemplary embodiment of the invention in the form of a provision device.

Specifically, the provision device for providing messages which can be authenticated comprises a first calculation module 310, a second calculation module 320, an optional first communication interface 304 and a first provision module 330 which are communicatively connected to one another via a first bus 303.

The provision device may additionally also comprise, for example, one or more further components, for example a processor, a storage unit, an input device, in particular a computer keyboard or a computer mouse, or a monitor.

The messages can be provided, for example, by means of the first communication interface 304. For example, the messages can be generated by means of a first generation module.

The first calculation module 310 is set up to determine a repeating message content of the messages.

The first calculation module 310 may be implemented, for example, by means of the processor, the storage unit and a first program component which configures the processor, for example by executing program instructions, in such a manner that the repeating message content is determined.

The second calculation module 320 is set up to calculate partial authentication codes for the messages on the basis of the repeating message content, wherein a first authentication code for at least some of the messages can be calculated from at least some of the partial authentication codes for authenticating the repeating message content.

The second calculation module 320 can be implemented, for example, by means of the processor, the storage unit and a second program component which configures the processor, for example by executing program instructions, in such a manner that the partial authentication codes are calculated.

The first provision module 330 is set up to provide the messages, wherein the messages comprise the repeating message content and at least one of the partial authentication codes in each case.

The first provision module 330 may be implemented, for example, by means of the processor, the storage unit and a third program component which configures the processor, for example by executing program instructions, in such a manner that the messages are provided.

The first calculation module 310 and the second calculation module 320 may also be in the form of a first integral calculation module, for example.

In one variant of the provision device, the provision device is provided with a (cryptographic) key for calculating the partial authentication codes. The provision is effected via a secure communication channel. The cryptographic key can also be used, for example, to calculate the second authentication code which forms the basis for the partial authentication codes in some embodiments, for example.

Figure 4:
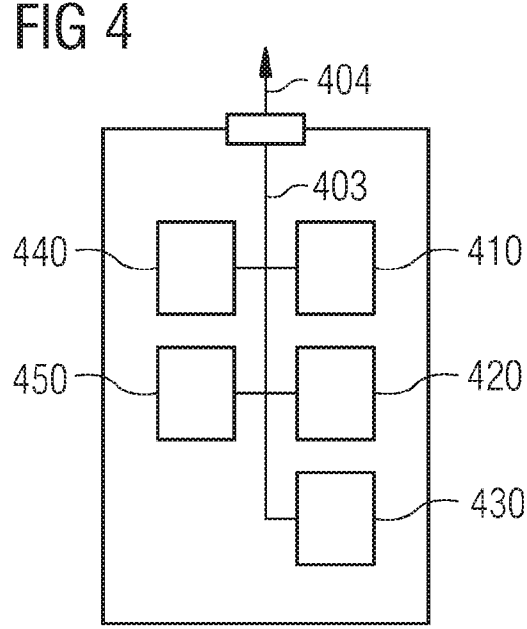
FIG. 4 shows a fourth exemplary embodiment of the invention in the form of an authentication device.

FIG. 4 is a fourth exemplary embodiment of the invention in the form of an authentication device.

The authentication device for authenticating messages which can be authenticated comprises a third calculation module 410, a fourth calculation module 420, a fifth calculation module 430, a first comparison module 440, a second optional communication interface 404 and a first determination module 504 which are communicatively connected to one another via a second bus 403.

The authentication device may additionally also comprise, for example, one or more further components, for example a processor, a storage unit, an input device, in particular a computer keyboard or a computer mouse, or a monitor.

The messages can be received by means of the second communication interface 404, for example.

The third calculation module 410 is set up to determine a repeating message content of the messages.

The third calculation module 410 may be implemented, for example, by means of the processor, the storage unit and a fourth program component which configures the processor, for example by executing program instructions, in such a manner that the repeating message content is determined.

The fourth calculation module 420 is set up to determine partial authentication codes of the messages for the repeating message content.

The fourth calculation module 420 may be implemented, for example, by means of the processor, the storage unit and a fifth program component which configures the processor, for example by executing program instructions, in such a manner that the partial authentication codes are determined.

The fifth calculation module 430 is set up to calculate local partial authentication codes for the messages on the basis of the repeating message content.

The fifth calculation module 430 may be implemented, for example, by means of the processor, the storage unit and a sixth program component which configures the processor, for example by executing program instructions, in such a manner that the local partial authentication codes are calculated.

The first comparison module 440 is set up to compare the partial authentication codes with the corresponding local partial authentication codes.

The first comparison module 440 may be implemented, for example, by means of the processor, the storage unit and a seventh program component which configures the processor, for example by executing program instructions, in such a manner that the partial authentication codes are compared with the corresponding local partial authentication codes.

The first determination module 460 is set up to determine an authenticity and/or an integrity of the repeating message component if a sufficient correspondence between the partial authentication codes and the local partial authentication codes is determined.

The first determination module 460 may be implemented, for example, by means of the processor, the storage unit and an eighth program component which configures the processor, for example by executing program instructions, in such a manner that an authenticity and/or an integrity of the repeating message content can be determined.

In one variant of the authentication device, the authentication device is provided with a (cryptographic) key for creating a third authentication code using the repeating message content and/or the local partial authentication codes. The provision is effected via a secure communication channel.

Figure 5:
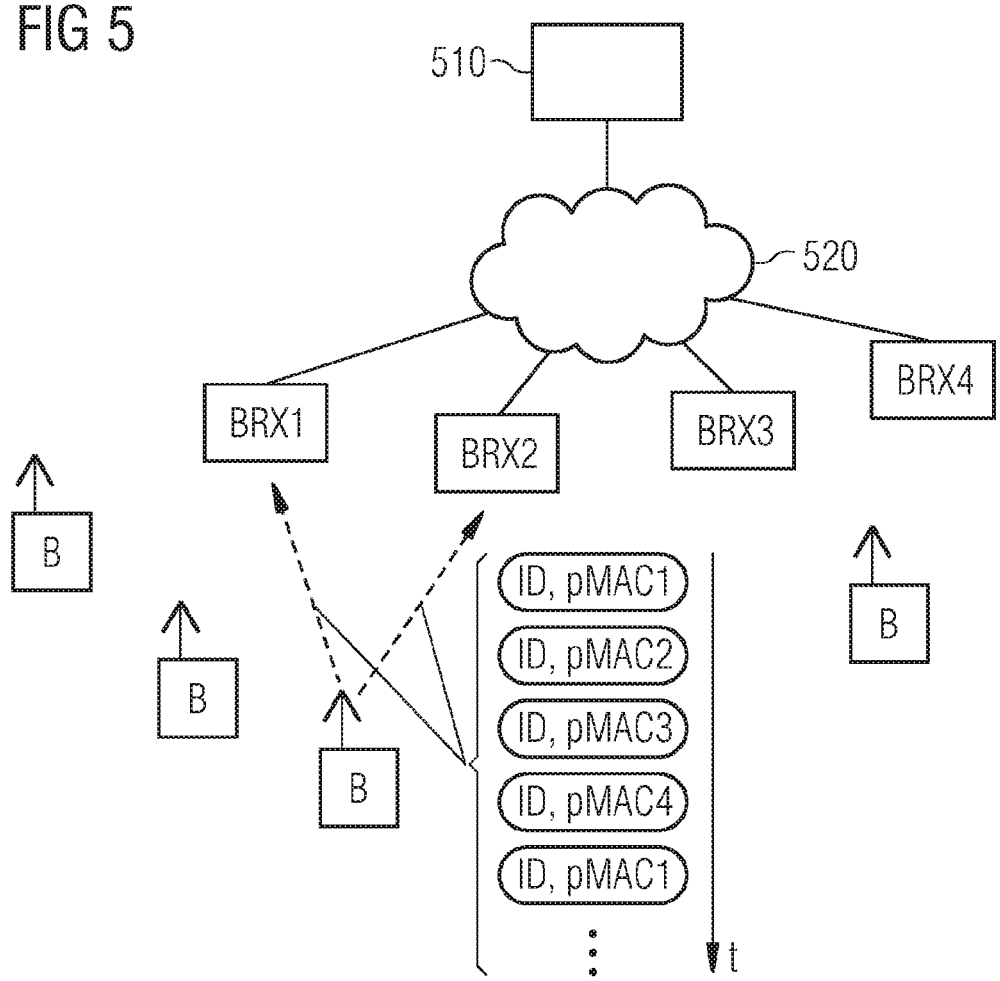
FIG. 5 shows a fifth exemplary embodiment of the invention in the form of a system.

FIG. 5 shows a fifth exemplary embodiment of the invention in the form of a system.

Specifically, the system may have at least one provision device according to embodiments of the invention which provides messages B, which can be authenticated and have repeating message content, in accordance with the method according to embodiments of the invention which is illustrated in FIG. 1, for example. In this case, the messages are provided, in particular, at certain and/or stipulated times t, according to a predefined timing scheme. The timing scheme may specify, for example, cyclical repetition of the repeating message content.

In the specific exemplary embodiment, the system comprises a first provision device according to embodiments of the invention and a second provision device according to embodiments of the invention which provide or emit the messages B.

The system may additionally comprise at least one authentication device according to embodiments of the invention, for example a first authentication device BRX1 according to embodiments of the invention, a second authentication device BRX2 according to embodiments of the invention, a third authentication device BRX3 according to embodiments of the invention and a fourth authentication device BRX4 according to embodiments of the invention, which authenticates the messages B, which can be authenticated and have repeating message content, in accordance with the method according to embodiments of the invention which is illustrated in FIG. 2, for example. In this case, an authenticity and/or an integrity of the repeating message content is/are intended to be determined, in particular, if a sufficient correspondence between the first authentication code and the third authentication code has been determined, for example. The authentication devices can be communicatively connected to a network 520 to communicate with one another or with a backend 510, for example.

The authentication devices can interchange the messages B having the repeating message content and the partial authentication codes provided by the at least one provision device with one another, for example, if, for example, the provision device is outside the reception range of the first authentication device BRX1, but the other authentication devices BRX2-BRX4 can still receive the messages.

The messages B are repeatedly emitted by one of the provision devices and comprise, for example, an item of transmitter identification information ID relating to the transmitter, for example a MAC address and/or a Universally Unique Identifier (UUID) and/or a pseudonym. The messages B each additionally comprise a partial authentication code, for example a first partial authentication code pMAC1 of a first message B, a second partial authentication code pMAC2 of a second message B, a third partial authentication code pMAC3 of a third message B and a fourth partial authentication code pMAC4 of a fourth message B.

The authentication devices BRX1-BRX4 store, for example, a plurality of messages having the same transmitter identification information and form the first authentication code, for example a checksum, using the partial identification codes pMAC1-pMAC4 and check said first authentication code, or the authentication devices BRX1-BRX4 each directly check the partial authentication codes pMAC1-pMAC4. The authentication devices BRX1-BRX4 can then determine, for example, a security level, for example a measure of confidence, depending on the number of checked partial authentication codes pMAC1-pMAC4.

In another variant, BRX1-BRX4 are in the form of receivers or forwarding devices. Specifically, the messages B are received by the receivers BRX1-BRX4 and are evaluated by a backend service of a backend 510. The messages are each received by the receivers BRX1-BRX4 and are transmitted or forwarded to the backend service, for example via the network 520. In this case, the backend 510 comprises an authentication device according to embodiments of the invention, by means of which the backend service then evaluates the messages from a transmitter (for example from a particular transmitter) which have been received by a particular receiver BRX1-BRX4. Alternatively, the backend service can jointly or centrally evaluate the messages received by different receivers BRX1-BRX4 and made available/forwarded to the backend service. In this case, the evaluation is understood as meaning a determination of the authenticity and/or the integrity of the repeating message content if there is a sufficient correspondence between the third authentication code and the first authentication code.

Figure 6:
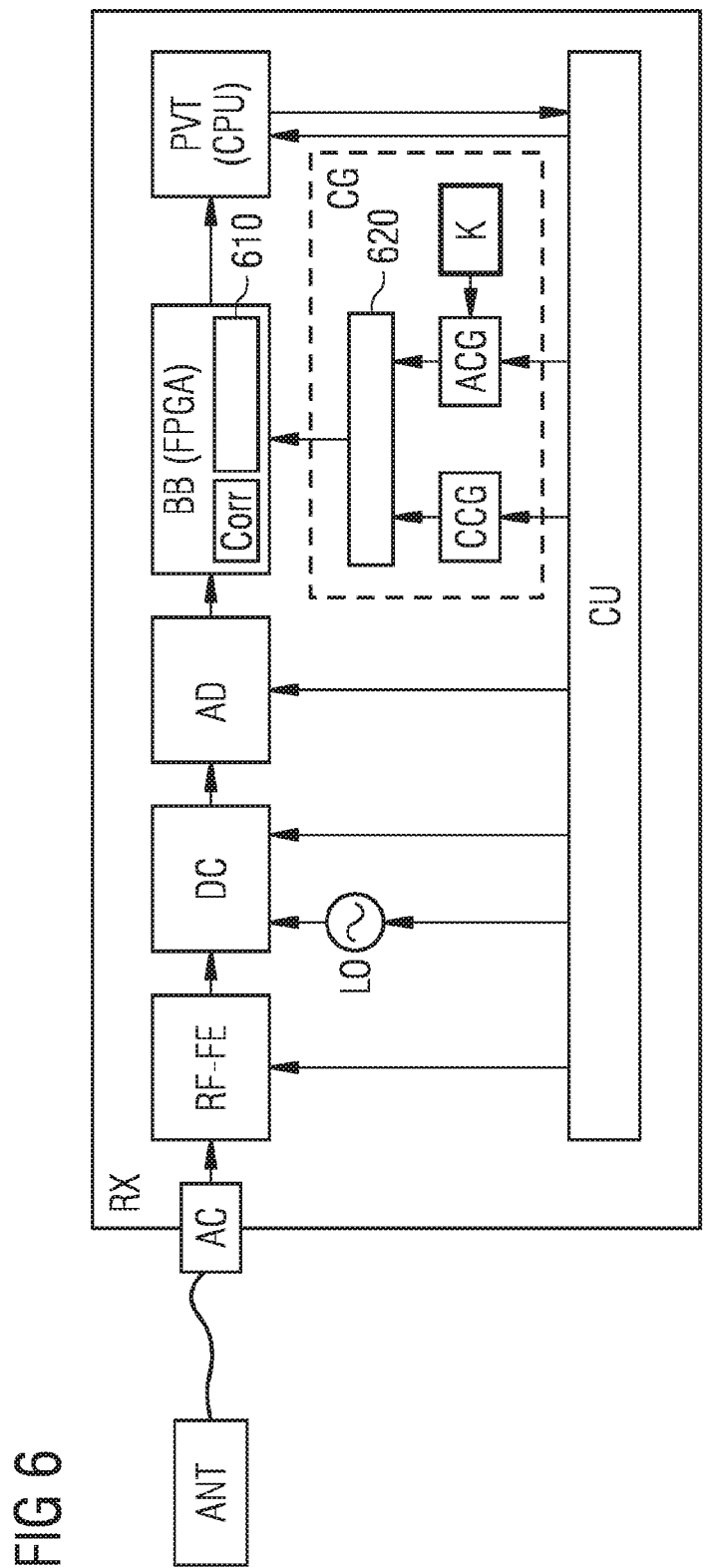
FIG. 6 shows a sixth exemplary embodiment of the invention.

FIGS. 6-8 show a sixth exemplary embodiment of the invention.

The method according to embodiments of the invention can also be implemented in spread spectrum transmission in which messages having a repeating message content, for example a cyclically repeating spreading code sequence, are transmitted by a transmitter, wherein the messages or repeating message content is/are, in particular, a cyclically repeating message content or a cyclically repeating spreading code sequence. The repeating message content or cyclically repeating spreading code sequence may be, for example, gold code or a code sequence generated by means of an LFSR, or a Neumann-Hoffman (NH) secondary code, as are used, for example, by Galileo, GPS or Beidou satellite navigation systems.

According to embodiments of the invention, such a repeating spreading code sequence may respectively have a partial authentication code.

The method according to embodiments of the invention for providing messages which can be authenticated can be applied, for example, to this repeating spreading code sequence, as explained in the first two exemplary embodiments and their variants, for example.

The respective partial authentication codes of the respective messages can be provided in different ways. In the method according to embodiments of the invention, for example, the messages or the repeating message content of the messages, in particular the cyclically repeating spreading code sequence, can be extended with the respective partial authentication code. Alternatively, the respective partial authentication code can replace a part of the repeating message content or can be linked to the repeating message content by an exclusive OR.

A receiver can receive the signal (can also be referred to as a transmission signal in particular) from a navigation satellite, which comprises the messages having the repeating message content, by means of a correlator. For this purpose, the receiver carries out, for example, a correlation between the received signal and a local spreading code or the local spreading code sequence to determine, for example, the ranging code, that is to say a propagation time estimate. If the received signal corresponds to the local spreading code sequence, which is also referred to as a replica or replica signal for example, a correlation peak arises. The height, which is also referred to as the level for example, of the correlation peak is an indicator of the power or the signal strength of the received signal.

According to embodiments of the invention, the receiver checks the temporal profile of the correlation peak level to check the partial authentication codes of the transmitter.

For this purpose, in the case of the replica signal for example, the receiver forms corresponding local partial authentication codes for the corresponding sections of the repeating message content. In other words, the partial authentication codes of the replica signal are the local partial authentication codes of the receiver.

If the partial authentication codes of the replica signal, which comprises, for example, the messages having the repeating message content and/or partial authentication codes of the respective messages, correspond to the partial authentication codes of the received signal, no power drop can be observed.

In contrast, if the partial authentication codes of the received transmission signal are invalid, a drop in the signal level can be observed. A received signal from a transmitter, which comprises the messages having the repeating message contents or the cyclically repeating spreading code sequence, is accepted as valid if the correlation peak corresponds when comparing the respective partial authentication code section of the respective message in the signal from the transmitter with the respective local partial authentication code section of the respective message in the replica signal.

FIG. 6 shows, for example, a block diagram having essential functional blocks of a receiver RX, to which an antenna ANT can be connected via an antenna connector AC (alternatively an internal antenna could also be provided). The signal provided by the antenna is processed (filtering, amplification) by a radio-frequency assembly RF-FE (Radio Frequency Front End), is then made available to a downconverter DC which mixes the signal with a signal from the local oscillator LO (down conversion) and makes it available to an analog/digital converter AD. The latter provides the baseband processing BB with at least one digitized signal (a plurality of signals may also be provided).

Within the baseband processing BB, a spreading code is generated by a code generator CG and a correlation with the digitized reception signal is carried out by a correlator Corr. The propagation time estimate determined thereby, for example pseudo-ranges, is made available to a calculation component PVT which calculates, for example, the position, velocity and time therefrom.

The receiver RX is controlled by a control unit CU. The latter also configures the assemblies, for example to select a frequency band by changing the frequency of the local oscillator LO, to configure the input filter of the radio-frequency assembly RF-FE, to configure the bandwidth and sampling rate of the analog/digital converter AD or to select a modulation method of baseband processing BB. The data determined by the calculation component PVT are made available to the control unit CU by the calculation component PVT. In the control unit, said data can be processed further, for example, and can be output on a user interface (not illustrated). In a variant which is not illustrated, one or more of the assemblies may also provide the control unit CU with status signals. in one specific implementation, the baseband processing BB is typically carried out in an FPGA module and the calculations of the calculation component PVT are usually implemented as software components which configure a CPU/processor for these calculations. The signal flow and the signal processing are carried out continuously, in particular, in this case, that is to say the reception signal is continuously digitized and processed.

Specifically, the spreading code sequence which is generated by the code generator CG has two partial spreading code sequences: a cyclically repeating code and a partial authentication code. The cyclically repeating code is generated, in particular, by the cyclic code generator CCG. The partial authentication code is generated, in particular, by an authentication code generator ACG which generates the respective partial authentication code using a (cryptographic) key K. These two codes are combined by a code combiner 620, to form the spreading code sequence or messages having repeating message content and comprise the respective partial authentication code.

The temporal profile of the correlation peak is monitored by a comparison component 610 (peak level verifier) to check or identify, during the correlation with the received signal, whether the latter has the expected partial authentication codes. Only if this is the case does the peak level of the correlation peak remain substantially unchanged, in particular, and otherwise it falls at the times at which the spreading code sequence has a corresponding partial authentication code in an incorrect form.

The transmitter, for example a GNSS satellite, has a corresponding code generator which is used to generate the spread spectrum transmission signal, for example a spreading code sequence, wherein the spread spectrum transmission signal comprises the corresponding partial authentication codes for messages having a repeating message content.

FIG. 7 and FIG. 8 show the basic functional principle.

Specifically, FIG. 7 shows a scenario in which a valid signal is received.

A transmitter first of all generates a first signal, for example a spread spectrum signal 710, which comprises the messages or the spreading code sequences. Specifically, the spread spectrum signal 710 comprises the messages or the spreading code sequences having a cyclically repeating message content RM and partial authentication codes for respectively different sections of the cyclically repeating message content RM, for example a first partial authentication code pMAC1A and a second partial authentication code pMAC2A. The messages or the spreading code sequences are illustrated in abbreviated form in this case. These would each be 50, 100, 1000, 16,000 bits (chips) long, for example.

The transmitter, for example the GPS/Galileo satellite, transmits the spread spectrum signal 710 having the cyclically repeating message content RM, wherein a partial authentication code, for example the first partial authentication code pMAC1A or the second partial authentication code pMAC2A, is respectively inserted between the cyclically repeating message content RM. In other words, messages having a cyclically repeating message content RM are generated, in particular, wherein the messages each additionally comprise a partial authentication code over a section of the cyclically repeating message content RM.

The receiver uses the same or an identical spreading code sequence to generate a replica signal 720. In other words, the receiver generates, for example, the same cyclically repeating message content RM, for example the spreading code sequence, as is also generated by the transmitter. Like the transmitter, for example, the receiver then calculates the corresponding local partial authentication codes for the same sections of the repeating message content RM. For example, the receiver forms a local third partial authentication code pMAC1B on the basis of the repeating message content RM of the replica signal 720. This local third partial authentication code pMAC1B is formed, in particular, using the same section of the repeating message content RM as the first partial authentication code pMAC1A. Accordingly, a local fourth partial authentication code pMAC2B is likewise formed on the basis of the corresponding section of the replica signal 720 for that section of the repeating message content RM for which the second partial authentication code pMAC2A was formed, for example.

The correlator of the receiver compares the signal 710 from the transmitter with the replica signal 720 from the receiver. For this purpose, the signals 710, 720 can be divided into intervals of time. For example, the repeating message content RM is compared during a first interval I1, a third interval I3 and a fifth interval I5. The partial authentication codes are compared, for example, or their validity is determined during the second interval I2 and the fourth interval I4.

Specifically, the transmitter generates, in particular, a comparison signal 730 which indicates the peak level (Lnorm) of the correlation peak. If the signal 710 from the transmitter has a sufficient correspondence to the replica signal 720, for example the peak level (Lnorm) of the correlation peak remains above a threshold value (Lmin), an authenticity and/or integrity of the signal or of the repeating message content is/are determined. In real signals in particular, the peak level (Lnorm) fluctuates on account of dynamic changes in the radio transmission path (the peak value would be constant if modeled in a purely mathematical manner). In particular, as explained in the other exemplary embodiments, a first authentication code may be formed from the partial authentication codes, which first authentication code has a higher security level than a partial authentication code per se.

FIG. 8 shows a scenario in which an invalid signal is received.

If, for example, a manipulated or corrupted transmitter now transmits an interference signal 721, this signal does not have any valid partial authentication codes since the transmitter does not know the required (cryptographic) key. A fifth partial authentication code pMAC-W would have an incorrect value, for example, or a sixth partial authentication code pMAC-X would have a constant value, for example 0.

The receiver identifies this, for example, from a drop in the peak level of the correlation peak in the periods of time, for example interval I2 and interval I4, in which the partial authentication codes are each transmitted.

If such a signal property is identified, for example, by the comparison component 610 (peak level verifier), the signal from the transmitter is treated as invalid. If, for example, a certain number of partial authentication codes, for example periods of time or intervals with valid partial authentication codes, are received again without a drop in the peak level, the received signal is accepted as valid again, for example.

This exemplary embodiment in which the partial authentication codes are checked or compared by correlating signals (signal processing) has the advantage, in particular, that this can also be used in spread spectrum signals, the signal level of which is below the noise threshold (as is the case, for example, in GPS, Galileo, Beidou). There is therefore no comparison at the bit level of the decoded bits, in particular, but rather it is indirectly identified, for example, on the basis of the observed temporal profile of the peak level of the correlation peak, whether the partial authentication codes have the expected value (or correspond sufficiently).

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for providing messages which can be authenticated, the method comprising:
   determining a repeating message content of the messages, the repeating message content comprising at least one of: a cyclically repeating message, a repeated and incremented message, and a repeated message subject to a slow change frequency;
   calculating partial authentication codes for the messages on a basis of the repeating message content, wherein a first authentication code for at least some of the messages can be calculated from at least some of the partial authentication codes for authenticating the repeating message content; and
   providing the messages, wherein the messages comprise the repeating message content and at least one of the partial authentication codes in each case.

2. The method as claimed in claim 1, wherein the partial authentication codes are calculated on a basis of a second authentication code, and the second authentication code is calculated on the basis of the repeating message content.

3. The method as claimed in claim 1, wherein a first length of the respective partial authentication codes is stipulated for the respective messages.

4. The method as claimed in claim 1, wherein a predefined minimum length of the first authentication code is determined by a first number of the messages.

5. The method as claimed in claim 1, wherein an authenticity and/or an integrity of the repeating message content of the messages is/are determined on the basis of a second number of the messages and their respective partial authentication codes.

6. The method as claimed in claim 1, wherein the first authentication code and/or the second authentication code is/are a message authentication code and/or a stream cipher.

7. The method as claimed in claim 1, wherein the partial authentication codes are sections of the second authentication code, and/or the partial authentication codes are sections of the stream cipher or of a stream cipher.

8. A provision device for providing messages which can be authenticated, comprising:
   a first calculation module for determining a repeating message content of the messages, the repeating message content comprising at least one of: a cyclically repeating message, a repeated and incremented message, and a repeated message subject to a slow change frequency;
   a second calculation module for calculating partial authentication codes for the messages on a basis of the repeating message content, wherein a first authentication code for at least some of the messages can be calculated from at least some of the partial authentication codes for authenticating the repeating message content; and
   a first provision module for providing the messages, wherein the messages comprise the repeating message content and at least one of the partial authentication codes in each case.

9. An authentication device for authenticating messages which can be authenticated, comprising:
   a third calculation module for determining a repeating message content of the messages, the repeating message content comprising at least one of: a cyclically repeating message, a repeated and incremented message, and a repeated message subject to a slow change frequency;
a fourth calculation module for determining partial authentication codes of the messages for the repeating message content;
a fifth calculation module for calculating local partial authentication codes for the messages on the basis of the repeating message content;
a first comparison module for comparing the partial authentication codes with the corresponding local partial authentication codes; and
a first determination module for determining an authenticity and/or an integrity of the repeating message content if there is a sufficient correspondence between the partial authentication codes and the corresponding local partial authentication codes.

* * * * *